United States Patent [19]

Opferkuch, Jr. et al.

[11] 4,076,620
[45] Feb. 28, 1978

[54] PROCESS FOR THE DISPOSAL OF SEWAGE

[75] Inventors: Robert E. Opferkuch, Jr., Kettering, Ohio; George M. Wong-Chong, Ithaca, N.Y.

[73] Assignee: Monsanto Research Corporation, St. Louis, Mo.

[21] Appl. No.: 406,725

[22] Filed: Oct. 15, 1973

Related U.S. Application Data

[63] Continuation of Ser. No. 200,827, Nov. 22, 1971, abandoned, which is a continuation-in-part of Ser. No. 103,658, Jan. 4, 1971, abandoned.

[51] Int. Cl.² ............................................. C02C 1/40
[52] U.S. Cl. .................................... 210/45; 210/51
[58] Field of Search ............................ 210/18, 45–53, 210/60, 61

[56] References Cited

U.S. PATENT DOCUMENTS

| | | | |
|---|---|---|---|
| 486,172 | 11/1892 | Wollheim | 210/50 |
| 2,072,154 | 3/1937 | Butterfield | 210/45 |
| 2,259,717 | 10/1941 | Zentner | 210/46 X |
| 2,348,123 | 5/1944 | Green et al. | 210/49 |
| 3,386,911 | 6/1968 | Albertson | 210/46 X |
| 3,455,820 | 7/1969 | Joyce et al. | 210/40 |
| 3,546,111 | 12/1970 | Busch | 210/45 X |
| 3,736,254 | 5/1973 | Croom | 210/45 X |

OTHER PUBLICATIONS

Mulbarger, M. C., et al., "Lime Clarification, etc.," Jour. WPCF, vol. 41, 12/1969, pp. 2070–2085.

*Primary Examiner*—Thomas G. Wyse
*Attorney, Agent, or Firm*—Bruce Stevens

[57] ABSTRACT

The process embodying the discovery of the effects of large lime dosages on sewage sludge character consists of: adding lime to raw, sanitary sewage in amounts to exceed a 1:1 weight ratio of lime to COD, or at least 500 ppm lime; immediately treating with carbon dioxide to reduce the pH of the limed sewage mixture to about pH 11; providing a brief period for settling of sludge from the aqueous phase; further adjustment of effluent pH with carbon dioxide to a pH below about 8; discharge of treated effluent water; burning of the sludge to incinerate the organic matter and calcine the calcium carbonate to lime for reuse in the process. This process permits treatment of sanitary sewage in about 30 minutes total as compared to several hours, e.g., 4–8 hours, for other methods of sewage treatment.

4 Claims, 3 Drawing Figures

PROCESS FOR THE DISPOSAL OF SEWAGE

CROSS REFERENCE TO RELATED APPLICATION

This is a continuation of application Ser. No. 200,827, filed Nov. 22, 1971, now abandoned, which is a continuation-in-part of application Ser. No. 103,658, filed Jan. 4, 1971, now abandoned.

BACKGROUND OF THE INVENTION

1. Field of the Invention

The invention relates to liquid purification or separation by a process of precipitating the solids and dissolved material by chemical treatment with lime and carbon dioxide. More particularly this invention is concerned with the treatment of sanitary sewage using lime.

2. Description of the Prior Art

The use of chemicals, particularly lime, for treating sanitary sewage is not new. Lime has been used in and around outdoor toilets, livestock areas, and compost heaps for generations to reduce odors and mitigate certain forms of putrescence through its apparent biostatic effect. Furthermore, lime has also been employed as a precipitant and a flocculating aid in the clarification of turbid waters and for the removal of hardness and certain other chemical compounds in water.

In a conventional process for treating sanitary sewage it is customary to first remove the coarser and heavier insoluble matter by gravity settling and/or screening. After this preliminary treatment, the concentration of the insoluble matter remaining in the sewage is on the average around 150 to 500 parts per million colloidal or finely divided suspended solid matter. The finely divided suspended or colloidal matter remaining after this primary settling step includes simple and complex organic and inorganic compounds. Conventional sewage treatment consists of subjecting this material to biological activity wherein this organic material is decomposed to water, carbon dioxide and other innocuous inorganic compounds. The means of biological treatment consist of anaerobic digestion and aerobic digestion through a variety of methods including activated sludge and trickling filters. All biological means of treatment have a basic, inherent disadvantage, viz. they are susceptable to disruption of biological activity from a variety of sources, e.g., toxic materials, shock organic and hydraulic loadings and the like. At best they require a minimum of 4–8 hours of treatment, with variable, unpredictable, and frequently uncontrollable results. General cognizance of this led numerous investigators to apply chemical and/or physicochemical methods to the treatment of sanitary sewage in order to improve treatment efficiency and processability.

Thus sewage containing this residual soluble and colloidal suspension of organic matter has been subjected to flocculation by agitation with added alkali in an amount sufficient to give the sewage a pH in excess of seven. Frequently, other flocculating agents or a combination of flocculating agents are used, such as disclosed in U.S. Pat. No. 1,956,420, wherein ferric sulfate solution and lime are used together to give a floc which settles more rapidly.

The solids produced by the settling of the coagulation of suspended matter and the flocculation treatment contain a number of substances as a result of the treatment. U.S. Pat. No. 3,386,911 teaches that lime not only acts to increase flocculating and the formation of sludge, but also precipitates phosphorus when used at a pH of between 8 and 9. However that reference is directed toward a combined chemical and biological treatment of sewage for the removal of phosphorus to overcome water pollution resulting from the growth and subsequent decay of algae in receiving waters.

U.S. Pat. No. 3,423,309, teaches an improvement in the extraction of phosphorus from sewage by treatment with massive doses of chemical precipitants for phosphorus such as calcium oxides, alum, or iron salts by using a balanced and interrelated system utilizing an initial limited chemical precipitant, such as lime, for the removal of phosphorus by carefully controlling the pH. Other references relative to the treatment of sanitary sewage include U.S. Pat. No. 3,440,165 which teaches a sequential addition of calcium chloride and hydrated calcium oxide for the flocculating of solids. U.S. Pat. No. 3,440,166 describes a waste treatment process with recycling of the flocculating agents. Further, U.S. Pat. No. 3,442,498 teaches a combined waste treatment with a cement making process for making cement economically from the waste materials.

In all of the teachings cited above, lime is applied to remove or reduce the COD, the Biochemical Oxygen Demand (BOD) of phosphorus or residual suspended solids in fine dispersion in the sanitary sewage. Maximum purification of sewage on the basis of COD or BOD removal is obtained upon the addition of about 400 parts per million lime (see for example "Lime Precipitation at Sowford" by T. Jones, in the Journal of the Proceedings of Industrial Sewage Purification (1954), pages 395–402). Consequently, it was accepted in the prior art that a maximum of about 400 ppm lime addition to sewage is all that was required for treatment.

There are several disadvantages to these practices in the prior art. First, the addition of lime to sewage in concentrations at or less than 400 ppm requires a flocculation period after mixing in order to build a flocculate. This period can last from one-half hour to two hours or more. After the flocculation period, a settling period is required to permit the flocculate to separate from the liquid. Again, a period of one-half hour to more than two hours is required. After this, the effluent from the settling operation is treated with carbon dioxide to adjust the pH and to recover excess lime in solution and the flocculation and settling steps must be repeated for the separation of the calcium carbonate formed. This adds additional hours, and the large volume of sewage being treated requires large and costly tankage.

A second disadvantage to ordinary treatment of sewage with lime at levels of 400 ppm or less is found in the type of sludge that is formed. Not only does it require a long time to form and settle, but it does not compact well, producing a watery sludge with solids content less than 1% without special thickening treatment that increases process complexity. This means that large quantities of sludge must be handled relative to the total sewage flow to the treatment process. Furthermore, these sludges, when they contain organic or biological matter, are difficult to dewater to higher solids content in the course of disposing of the sludge. Sludge dewatering is most desirably accomplished by vacuum filtration and these sludges, to be handled in a practical manner on rotary vacuum filters must be conditioned with various types of added chemicals. The improvement by conditioning the sludge is frequently marginal and usually costly.

Yet another disadvantage of the ordinary methods of treating sewage with lime at dosages at or below 400 ppm lime lies in the fact that the amount applied is "just the right amount" to attain maximum COD or BOD removal, based upon a statistical average value of these parameters for the sewage being treated. Since the values of these parameters cycle throughout the day, they obviously vary about the average value to considerable extent. Since the lime dosage does not take this variation into consideration, high values of COD, or BOD, would not receive the same amount of treatment as the average values, since the lime dosage is marginal in this respect. Thus, the effluent from the treatment process would show cyclic values of COD and BOD instead of a uniform low, or "floor" value of these parameters on a continuous basis.

The present invention overcomes the disadvantages of the prior art by providing a process that adds lime to raw, sanitary sewage in amounts far in excess of that previously used and thereby produces sludge that settles extremely rapidly without a separate flocculation step, compacts on settling to solids contents in excess of 3% solids by weight, dewaters by vacuum filtration with filter cake yields at least three times those achieved by prior art of chemical or biological treatment, and produces a clear, treated effluent at a consistent, continuous "floor" level of COD and BOD that is independent of variation of the feed values of these parameters up to two to three times their average values.

SUMMARY OF THE INVENTION

It is therefore one object of this invention to provide purification of sanitary sewage at an extremely rapid rate. It is another object to provide an improved process for precipitation and removal from sanitary sewage of colloidal and suspended matter leaving a crystal-clear, liquid effluent. It is another object to provide an improved process for precipitation of colloidal and suspended matter in sanitary sewage to form a sludge, without a flocculation step, that settles extremely rapidly and compacts to a degree otherwise attainable only through special sludge thickening methods. Another object of this invention is to provide an improved sewage treatment process that produces sludge that is easily dewatered by mechanical means to high solids contents.

These and other objects are achieved by a process for treating sanitary sewage which comprises the steps of: adding lime to the raw sewage to exceed a one-to-one weight ratio of lime to the chemical oxygen demand, but not less than 500 parts per million lime; and separating the solids in the limed sewage. In a more limited embodiment the process comprises the further step of treating the limed sewage with carbon dioxide to reduce the pH of the sewage to about 10.6 to 11.2.

One major difference between the high-rate treatment of sewage by this invention and ordinary physical-chemical treatment of sewage is the rapidity with which the wastewater is treated. This difference in "treatment time" is the result of the unique sludge characteristics obtained, and directly affects treatment economics. High-rate treatment of waste water by this invention is basically a physical-chemical method of treatment that takes advantage of unusual characteristics of sludge produced by adding lime in unusually high dosages. The two principal, unusual features of the sludge are the extremely rapid settling, and the ease of dewatering. These features make it possible to design a waste water treatment plant utilizing chemical process technology.

When lime was added to raw sewage in static tests, the COD was not significantly reduced over 80% at lime additions of greater than 400 ppm, which had been reported in the prior art. Surprisingly though, the rapidity with which the sludge settled at lime additions of greater than 500 ppm and the clarity of the effluent was unexpected. At increasing lime additions, the settling rate increases and the clarity of the effluent increases at equivalent settling periods for various dosages of lime. To those skilled in the art of chemical coagulation, flocculation, and sedimentation, the art prescribes the addition of chemical coagulant, followed by a period of flocculation, followed by a period of settling for the developed floc. Furthermore, the clarity of effluent produced after settling of the developed floc depends upon the time of settling. As previously noted, the time for floc development and settling of the flock in the prior art requires several hours. However, the effluent from those mixtures wherein lime was added at, or above, 500 ppm displayed turbidity, as measured by scattered light and reported in Jackson Turbidity Units, at less than 10 while those effluents, or supernatants, from dosages less than 500 ppm lime displayed Jackson turbidity of 50 or greater.

Thus, a significant difference observable in treatment of sewage with high dosages of lime as prescribed in this invention, is not only the rapidity with which the sludge settles but the clarity of the supernatant which further defines the effectiveness of clarification.

A further criterion of the rapidity of sludge settling and its significance is manifested in the rate of upflow velocity during clarification in dynamic studies as measured by gallons/minute-square foot of clarifier surface. In ordinary chemical precipitation of sewage solids, after the flocculation step, clarifier upflow velocities are normally in the range of 0.5–0.9 gallons/minute-square foot. The sludge characteristics obtained with the practice of this invention permit clarifier upflow velocities, without a flocculation step, of 1.4–2.4 gallons/minute-square foot. This parameter of upflow velocity relates to the cross-sectional area of the clarifier. Thus for example, for a nominal 50 million gallon per day plant, ordinary chemical sludges would require 39–70 thousand square feet of clarifier surface while sludge from high rate treatment would require only 14–25 thousand square feet of clarifier surface.

Yet another indication of the rapidity of settling of the sludge obtained from practice of this invention is seen in the relative retention times in the clarifier comparing high rate treatment with ordinary chemical precipitation of sewage solids. In the former case, only 20 minutes maximum retention is required to provide effluent turbidity, in Jackson units, of 10 or less while in the latter case, retention times in the clarifier of 1–3 hours are required to produce effluent turbidity, in Jackson units of 10 to 50, under dynamic flow conditions.

Perhaps, the most surprising result observed in treating raw sewage with 500 ppm lime, or more, was the character of the sludge produced, particularly in compaction characteristics.

Results obtained in static tests show that the sludges from treatment with 500 ppm lime or greater compact to a higher solids content than the sludge from ordinary chemical treatment at less than 500 ppm lime. In dynamic tests, i.e., in continuous operation of a small scale treatment process, clarifier underflow solids content from high rate treatment have been observed at 3% solids while 0.7% solids in the clarifier underflow, or sludge, is the highest observed with ordinary, or low dosages of lime, i.e., less than 500 ppm lime.

A further indication of the unique character of the sludge obtained by the addition of high levels of lime to raw sewage can be seen in the examples where the relative filterability of sludge by vacuum filter leaf tests show that, not only does the cake dewater to higher solids content, but the cake production rate is approximately three times that obtained with ordinary sludges, and nearly five times that obtained with unconditioned biological sludges as represented by activated sludge.

Thus, it can be seen that the addition of lime to raw sewage to exceed a one-to-one weight ratio of lime to the COD, but not less than 500 ppm lime provides purification at an extremely rapid rate, leaving a crystal-clear effluent. The sludge precipitates without a separate flocculation step and settles extremely rapidly and compacts to a degree otherwise attainable only through special sludge thickening methods. Further, the sludge is easily dewatered by mechanical means to a high solids content.

DESCRIPTION OF THE PREFERRED EMBODIMENTS

Figure 1:
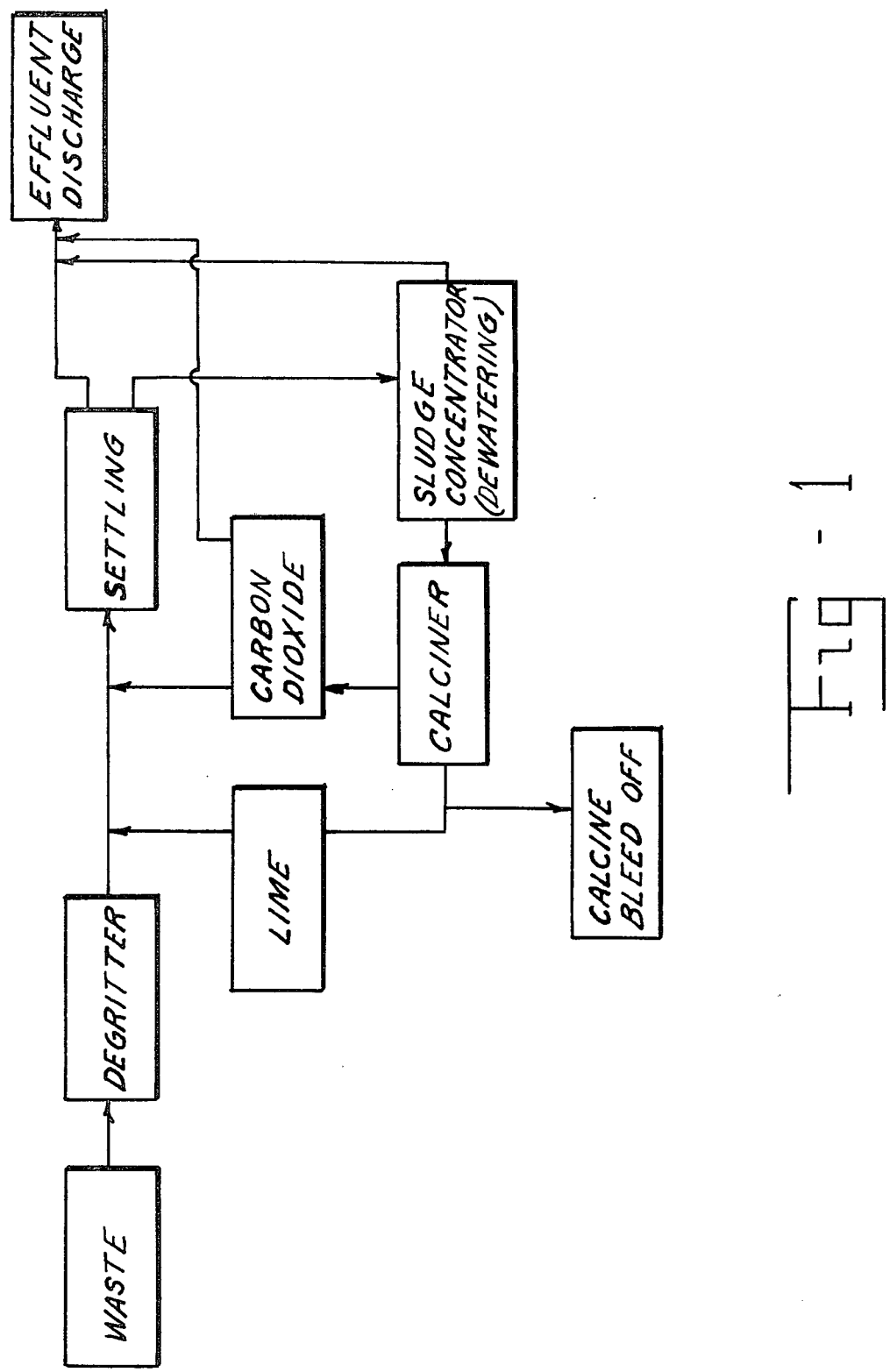
FIG. 1 is a block diagram of the improved process for treating sanitary sewage.

The process of the present invention may best be understood by referring to FIG. 1, which contains a number of pieces of equipment which are conventional in treating sanitary sewage. The raw sewage enters a degritting or screening process such as a hydrocyclone commonly known in the art for removing grit, broken glass and other objects that may be injurious to equipment in subsequent stages. Lime can be added as dry powder or as a slurry. The screened waste water is then treated with sufficient lime so that the weight ratio of lime to the COD is greater than one-to-one, and at least 500 parts per million (ppm) lime. Since the COD of the raw sewage is dependent upon the character of the community or the type of waste that is being treated, the exact concentration of lime to be added must be determined for each waste treatment plant; however, it has been found that 500 parts per million or more is desirable for domestic sewage.

Next, the limed waste is treated with carbon dioxide to reduce the pH of the treated waste to recover unused lime and to aid in the subsequent precipitation. Sufficient carbon dioxide is added to reduce the pH from greater than 12 to about 10.6 to about 11.2. The treated waste is then immediately passed into a settling area where the solids precipitate at once. The clear effluent is further carbonated to pH from about 6-8 and can be discharged to a natural waterway. The sludge can be concentrated without further treatment by means conventional in the art, such as by vacuum filtration or centrifugation, and the clear effluent from the sludge concentration step can be combined with the main stream of treated effluent for carbonation and subsequent discharge. The concentrated sludge is then calcined in a conventional furnace, such as a multihearth calciner or rotary kiln for recovery of lime and incineration of organic matter. The residue from the calcining operation can be used for land fill, and the lime recovered from the step can be recycled, along with makeup lime, for treatment of raw sewage. The carbon dioxide obtained from burning the organic material and converting calcium carbonate to lime in the calciner can be used as noted above for treating the limed incoming sewage.

By the use of this high rate lime treatment the settling stage for sludge thickening can be done by either conventional apparatus or a modification of conventional apparatus. In conventional practice sludge thickening is achieved essentially by gravity settling involving from one to four settling stages. By treatment with the high rate lime, multistage settling or thickening is not required and one stage settling is sufficient for the treatment. The separated sludge may have solids content as high as 3%, or higher.

Figure 2:
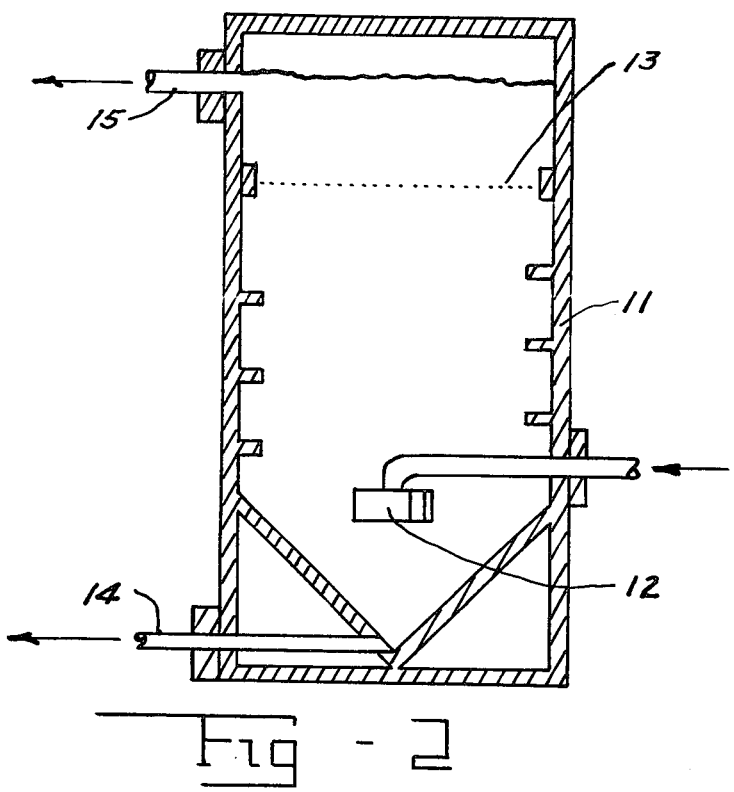
FIG. 2 is a cutaway drawing of an improved settling tank for separating the precipitated solids from the clear effluent.

In lieu of conventional settling tanks, a free-standing pipe can be used to separate the clear effluent from the precipitate. Indeed, during the practice of this invention a number of concepts were evaluated and one of many embodiments for the sludge separation step was conceived as shown in FIG. 2. Referring now to FIG. 2 the system consists of a cylindrical vessel 11 into which the treated waste was fed through a centrifugal distribution nozzle 12 to create a lateral circular motion. This motion simulates the effect of the paddle stirrer in a conventional flocculation stage causing the sludge particles to agglomerate, increase in size and density, and subsequently settle rapidly to the bottom of the cylindrical vessel 11. A filter medium 13 is placed at the top of cylindrical vessel 11. The filter medium 13 can be conventional, commercial filter cloth, but could be multiphase aggregate or even activated carbon. The bottom of cylindrical vessel 11 is funnel-shaped to collect the flocculated solids which are discharged from the vessel through sludge discharge port 14. The clear supernatant from the settling operation passing through filter medium 13 is discharged through supernatant discharge port 15 at the top of cylindrical vessel 11.

Figure 3:
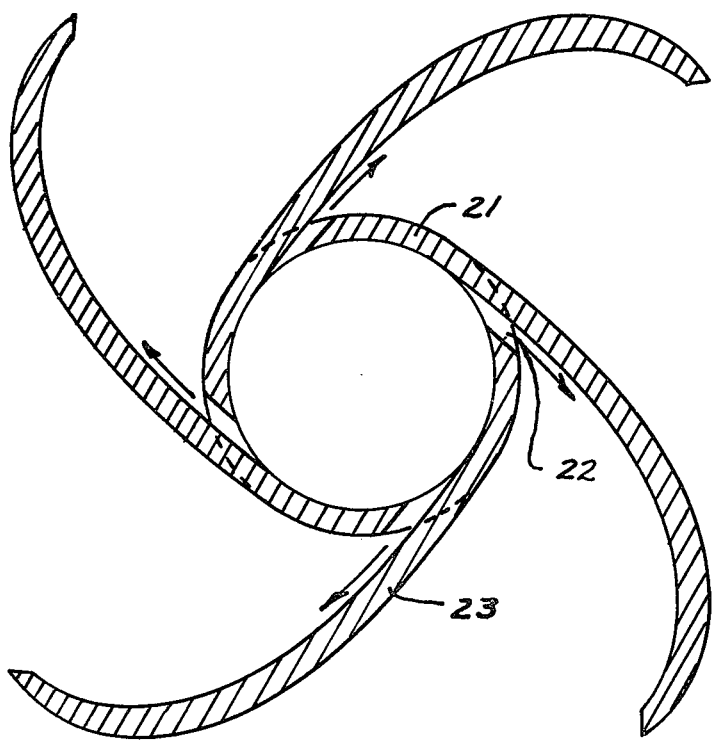
FIG. 3 is a cutaway drawing of an inlet pipe to impart a rotary motion to the treated waste.

The centrifugal distribution nozzle may best be understood by referring to FIG. 3. The limed sewage water is passed into the nozzle as seen from the top view, and discharged through pipe coupling 21 having holes 22 drilled tangential to the inner circumference of the pipe coupling. Directional vanes 23 are attached tangential to the outer circumference of pipe coupling 21, preferably near the holes 22 in the coupling. The curved surface of the directional vanes 23 help impart a rotary motion to the limed sewage waste.

Thus, it can be seen that one of many embodiments of the process for treating sanitary sewage consists of the sludge concentration step wherein solids in the limed sewage waste are concentrated by a process which comprises the steps of: introducing the lime-sewage waste into a tank having a funnel shaped bottom for the collection of solids; imparting a rotary motion to the limed sewage waste to urge the solids toward the wall of the tank by the centrifugal motion of the limed sewage waste; filtering the supernatant solution to ensure that the solids are retained; discharging the filtered supernatant solution; and collecting the concentrated sludge at the bottom of the tank.

It can also be seen that a limited embodiment of the method to impart the rotary motion to the limed sewage waste comprises passing the limed sewage waste through a hollow cylindrical body closed at one end having holes drilled tangential to the inner circumference, and directional vanes tangential to the outer circumference attached to the cylindrical body.

After the solids are separated from the supernatant solution, the separated sludge can be passed into a dewatering stage such as those are commonly found in ordinary sewage treatment plants. This can be a vacuum filter, a centrifuge or a pressure filter to increase the solids content of the thickened sludge. The effluent from the dewatering stage can be recycled to the settling stage or can be discharged directly into natural waterways depending on the clarity of the effluent. The dewatered sludge can be calcined in conventional apparatus, such as a multihearth calciner, well-known in the art to recover lime used in the process and to generate carbon dioxide which can be used in a carbonation stage. Thus there is no organic waste sludge for disposal; however, upon continuing recycling of the lime, a side stream of calcine must be removed, to avoid an excessive build-up of inert material, with subsequent addition of fresh lime.

The efficiency of the process may best be understood by referring to the following examples which demonstrate the rapidity and efficiency of the present invention in the treatment of sanitary wastewater. The invention is further illustrated by, but not limited to, the following examples, wherein screened, i.e., degritted, raw sewage from the Dayton, Ohio sewage treatment plant was used. Throughout this invention the analytical methods are those described in "Standard Methods and FWQA Methods for Chemical Analysis of Water and Waste," November, 1969.

EXAMPLE 1

In static tests lime was added at various dosages to one-liter quantities of raw sewage. The mixtures were stirred for two minutes and then allowed to settle while the settling characteristics of the sludge were observed. Lime dosages varied from 100–1000 ppm. The supernatant was tested for residual COD after five minutes of settling time. It was found that the reduction in COD was not significantly reduced beyond 80% at lime dosages greater than about 400 ppm. This result was expected from the prior art which evaluated only the amount of COD or BOD removed. The surprising rapidity with which the sludge settled is shown in Table 1 where it can readily be seen that the higher lime doses produced faster settling rates and clearer supernatant.

TABLE 1

| Lime dose, ppm | Supernatant Turbidity, Jackson Units | | | |
|---|---|---|---|---|
| | 100 | 250 | 500 | 1000 |
| Settling time, min. | | | | |
| 3 | 355 | 230 | 80 | <10 |
| 15 | 315 | 215 | 73 | <10 |

EXAMPLE 2

Further static tests were run to obtain data on the sludge characteristics. The sludge was subjected to a vacuum filter leaf testing POPR-913F filter cloth from Eimco, Corp. The conditions were as follows:
 a. 1 minute immersion;
 b. 2 minute drying time; and
 c. 25 inches mercury vacuum.
The results are shown in the following tabulation compared to activated sludge and ordinary physical-chemical treatment, i.e., about 400 ppm lime.

| Characteristics | Activated Sludge | Ordinary Physical-Chemical | 1000 ppm lime |
|---|---|---|---|
| Starting conc. - solids (%) | 0.75 | 0.60 | 1.3 |
| Vol. of filtrate (gal./ft.$^2$-hr.) | 8.5 | 32.0 | 48.0 |
| Cake production (lb./ft.$^2$-hr.) | 2.5 | 5.0 | 15.0 |
| Cake composition   solid (%) | 18.0 | 30.0 | 35.0 |
| Cake composition   water (%) | 82.0 | 70.0 | 65.0 |

These data clearly show that the relative filterability of this sludge, by vacuum filter leaf tests, is superior to conventional methods since the cake dewaters to higher solids content, and the cake production rate is approximately three times that obtained with ordinary chemical sludges, and nearly five times that obtained with unconditioned biological sludges.

EXAMPLE 3

A small model of the process as shown in FIG. 1 was constructed. The model consisted of a sewage feed pump, a 55 gallon drum used as lime slurry feed tank, rotometers to measure sewage and lime slurry flows, a two inch diameter pipe as carbonation column and a four-gallon clarifier. The piping consisted of ½ to 1 inch diameter pipes.

In operation, screened raw sewage from the Dayton, Ohio, sewage treatment plant was used. The sewage had a COD of about 400 parts per million (ppm). The sewage was pumped into the model system where slurried lime was added at a constant rate. The limed sewage was then passed to the clarifier without carbonation and the effect of the treatment was analyzed. The results obtained by conventional treatment with less than 500 ppm lime are compared with those from treatment with greater than 500 ppm lime by this invention in the following tabulation:

| | Conventional | | High Rate | |
|---|---|---|---|---|
| Raw Sewage Feed Rate (gal./min.) | 0.5 | 1.0 | 1.0 | 1.0 |
| Lime Dosage (ppm) | 350 | 400 | 800 | 1000 |
| Clarifier Retention Time (min.) | 8 | 4 | 4 | 4 |
| Clarifier Sludge Solids (wt.%) | 0.6 | 0.5 | 1.8 | 3.2 |
| Filter Leaf Sludge Cake Yield (lbs./hr.-sq.ft.) | 5.5 | 3.4 | 10.5 | 15.0 |
| Estimated Clarifier Effluent Turbidity (Jackson units) | 200 | 250 | 20 | 20 |
| Clarifier Effluent pH | 11.5 | 11.5 | 12–13 | 12–13 |

In continuous operation of the small scale treatment process, clarifier underflow solids content from high rate treatment was observed at 3% solids while 0.7% solids in the clarifier underflow, or sludge, is the highest observed with ordinary, or low dosages of lime, i.e., less than 500 ppm lime.

The relative difference in compaction of sludge during settling in the clarifier is typified by the data in Table 2. These results were obtained in the dynamic tests above, and show that the sludge from high rate treatment compacts to a higher solids content than the sludge from ordinary chemical treatment.

EXAMPLE 4

The process of Example 3 was repeated in the same model system except that the lime was added to the waste only at the 800 and 1000 ppm levels and the limed waste was treated with carbon dioxide prior to passage to the clarifier. The pH of the clarifier effluent was reduced to about 11.0 where calcium carbonate is most insoluble in water, permitting maximum recovery of lime with the sludge.

TABLE 2
TYPICAL SEWAGE AND SLUDGE SOLIDS DISTRIBUTION

|  | Before Treatment | After Treatment |
|---|---|---|
| Total Solids (ppm avg.) | 950 | 550 |
| Total Suspended Solids (ppm avg.) | 225 | 10 |
| Total Volatile Solids (ppm avg.) | 400 | 10 |

| | Treatment (Typical Values) | |
|---|---|---|
| | High Rate | Ordinary |
| Lime added (ppm) | 1000 | 350 |
| Equivalent CaCO₃ (ppm) | 1780 | 625 |
| Add Total Solids (ppm) | 950 | 950 |
| | 2730 | 1595 |
| Less Residual Total Solids (ppm) | 550 | 550 |
| Total Sludge Solids Produced (ppm) | 2180 | 1025 |
| SLUDGE: | | |
| Solids in Clarifier Underflow, % | 3.0 | 0.7 |
| Clarifier Underflow Rate, lb./m lb. sewage | 73,000 | 147,000 |
| Solids in Wet Cake to Incinerator, % | 50 | 30 |
| Rate to Incinerator, lb./m lb. sewage | 4350 | 3420 |

EXAMPLE 5

The process of Example 4 was repeated except that the clarifier effluent was subsequently treated with carbon dioxide to reduce the pH to near neutral, permitting the effluent to be discharged to a natural waterway. The results from Examples 4 and 5 are presented in the following tabulation wherein the results obtained by conventional treatment are compared with the high rate treatment of this invention:

| | Conventional | | High Rate | |
|---|---|---|---|---|
| Raw Sewage Feed Rate (gal./min.) | 0.5 | 1.0 | 1.0 | 1.0 |
| Lime Dosage (ppm) | 350 | 400 | 800 | 1000 |
| Clarifier Effluent pH Without Carbonation | 11.5 | 11.5 | 12–13 | 12–13 |
| Clarifier Effluent pH With Carbonation | — | — | 11.0 | 11.0 |
| Final Effluent pH With Carbonation | 8.5–9.5 | 8.5–9.5 | 7.5 | 7.5 |

Although the invention has been described in terms of specified embodiments which are set forth in considerable detail, it should be understood that this is by way of illustration only, and that the invention is not necessarily limited thereto, since alternative embodiments and operating techniques will become apparent to those skilled in the art in view of the disclosure. Accordingly, modifications are contemplated which can be made without departing from the spirit of the described invention.

We claim:
1. A high rate process for treating sanitary sewage which comprises the steps of:
   a. removing from the raw sewage objects injurious to equipment in subsequent steps;
   b. adding sufficient lime to the raw sewage to exceed a 1:1 weight ratio of lime to the chemical oxygen demand, but not less than 500 parts per million lime, the amount of lime being sufficient to permit the sewage to be treated including carbonation in step (C) and separation of step (d) is not more than 30 minutes with the separated effluent having a Jackson Turbidity of less than 50;
   c. immediately treating the limed sewage with carbon dioxide to reduce the pH of the sewage to about 10.6 to about 11.2;
   d. permitting the solids in the carbonated, limed sewage to settle and separating the solids and liquid effluent in not more than 30 minutes from lime treatment in step (b);
   e. concentrating the solids to remove additional fluids;
   f. combining the effluent from the solids concentration step with the effluent from the settling step; and
   g. treating the combined effluents with carbon dioxide to reduce the pH of the treated effluents to about 6 to 8, and thereafter discharging the effluents.

2. A process of claim 1 wherein the solids from the solid concentration step is calcined to recover lime and generate carbon dioxide for subsequent reuse in the process.

3. A high rate process for treating sanitary sewage which comprises the steps of:
   a. adding lime to the raw sewage to exceed a 1:1 weight ratio of lime to the chemical oxygen demand, but not less than 500 parts per million lime, the amount of lime being sufficient to permit the sewage to be treated including separation in (c) in not more than 30 minutes with the separated liquid having a Jackson Turbidity of less than 50;
   b. treating the limed sewage with carbon dioxide prior to separating the solids in the limed sewage from the liquid to reduce the pH of the sewage to about 10.6 to 11.2; and
   c. separating the solids in the limed sewage from the liquid in not more than 30 minutes from lime addition in (a).

4. A process of claim 3 comprising the additional step of treating the effluent from the separation step with carbon dioxide to reduce the pH of the clear effluent to about 6 to 8 prior to discharge.

* * * * *